United States Patent [19]

Wu et al.

[11] Patent Number: 5,611,053

[45] Date of Patent: Mar. 11, 1997

[54] APPARATUS AND METHOD FOR INTEGRATING BUS MASTER OWNERSHIP OF LOCAL BUS LOAD BY PLURAL DATA TRANSCEIVERS

[75] Inventors: Chih-Siung Wu, Saratoga; Chun-Jen Kuo, San Jose, both of Calif.

[73] Assignee: Advanced Micro Devices, Inc., Sunnyvale, Calif.

[21] Appl. No.: 184,295

[22] Filed: Jan. 21, 1994

[51] Int. Cl.$^6$ .................................................. G06F 11/00
[52] U.S. Cl. ........................... 395/280; 395/281; 395/309
[58] Field of Search .................................. 395/325, 275, 395/250, 282, 288, 309, 200.01, 306, 842; 370/85.7

[56] References Cited

U.S. PATENT DOCUMENTS

| | | | |
|---|---|---|---|
| 4,100,601 | 7/1978 | Kaufman et al. | 364/200 |
| 4,313,160 | 1/1982 | Kaufman et al. | 364/260 |
| 4,716,525 | 12/1987 | Gilanyi et al. | 395/250 |
| 4,902,986 | 2/1990 | Lesmeister | 331/25 |
| 5,067,071 | 11/1991 | Schanin et al. | 395/275 |
| 5,146,461 | 9/1992 | Duschatko et al. | 371/40.1 |
| 5,191,581 | 3/1993 | Woodbury et al. | 370/85.9 |
| 5,193,193 | 3/1993 | Iyer | 395/725 |
| 5,305,319 | 4/1994 | Sowell | 370/85.13 |
| 5,323,043 | 6/1994 | Kimura et al. | 257/371 |
| 5,335,329 | 8/1994 | Cox et al. | 395/282 |
| 5,336,915 | 8/1994 | Fujita et al. | 257/369 |
| 5,345,357 | 9/1994 | Pianka | 361/56 |
| 5,347,637 | 9/1994 | Halford | 395/325 |
| 5,379,386 | 1/1995 | Swarts et al. | 395/325 |
| 5,381,554 | 1/1995 | Langer et al. | 395/750 |
| 5,388,217 | 2/1995 | Benzschawel et al. | 395/275 |
| 5,388,224 | 2/1995 | Muskas | 395/325 |
| 5,392,407 | 2/1995 | Heil et al. | 395/325 |
| 5,394,526 | 2/1995 | Crouse et al. | 395/200.01 |
| 5,396,602 | 3/1995 | Amini et al. | 395/325 |
| 5,404,460 | 4/1995 | Datwyler et al. | 395/325 |
| 5,418,911 | 5/1995 | Zilka et al. | 395/325 |
| 5,418,914 | 5/1995 | Heil et al. | 395/325 |
| 5,420,988 | 5/1995 | Elliott | 395/275 |
| 5,426,739 | 6/1995 | Lin et al. | 395/325 |
| 5,430,849 | 7/1995 | Banks | 395/325 |

FOREIGN PATENT DOCUMENTS

| | | | |
|---|---|---|---|
| 0535873A1 | 4/1993 | European Pat. Off. | H03K 19/0185 |
| A62-018748 | 1/1987 | Japan | H01L 27/04 |
| A4-162658 | 6/1992 | Japan | H01L 23/58 |
| 2267984 | 6/1992 | United Kingdom | G06F 13/40 |

OTHER PUBLICATIONS

J. Novellino, IC Puts Ethernet And SCSI On A Motherboard, Electronic Design, Jan. 24, 1994, pp. 59, 60, 62, 66.
Bussysteme Report, c't 1993, Heft 10, pp. 120–122.
AMD Proposal For AMD/(Undisclosed Party) Joint Ether SCSI Development.
Golden Gate Design Specification (Revision 0.2).

Primary Examiner—Ayaz R. Sheikh
Attorney, Agent, or Firm—Fliesler, Dubb, Meyer & Lovejoy

[57] ABSTRACT

An integrated circuit is provided with: (a) a first plurality of local bus interface terminals for connecting to a local bus (e.g., PCI); (b) a second plurality of interface terminals for connecting to a first external communications channel (e.g., SCSI); (c) a third plurality of interface terminals for connecting to a second external communications channel (e.g., Ethernet); (d) a local bus interface means, connected to the first plurality of local bus interface terminals, for interfacing with the corresponding local bus and thereby applying a predefined load to the local bus; (e) a signal multiplexing means, operatively coupled to the local bus interface means, to the first communications channel (SCSI), and to the second communications channel (Ethernet), for selectively routing signals between the local bus interface means and a selected one of the first and second external communications channels (e.g., SCSI or Ethernet); and (f) an interface ownership designating means, operatively coupled to the multiplexing means, for designating one of the first and second communications channels (e.g., SCSI or Ethernet) as a current-owner of the local bus interface means and for controlling the multiplexing means to route signals between the local bus interface means and the designated current-owner of the local bus interface means.

26 Claims, 4 Drawing Sheets

APPARATUS AND METHOD FOR INTEGRATING BUS MASTER OWNERSHIP OF LOCAL BUS LOAD BY PLURAL DATA TRANSCEIVERS

BACKGROUND

1. Field of the Invention

The invention relates generally to digital systems using a bus master architecture for data exchange. The invention relates more specifically to a method and apparatus for coupling plural communication channels such as Ethernet and SCSI to a local bus such as a PCI local bus.

2a. Limited Waiver of Copyright

This application includes a listing of an HDL (Hardware Descriptor Language) source code for use with a computer program that compiles the source code into an implementation description of corresponding hardware.

In so far as the HDL source code constitutes a copyrightable computer program, the assignee of the present application claims such copyrights in said HDL source code listing. The assignee has no objection, however, to the reproduction by others of this listing if such reproduction is for the sole purpose of studying it to understand the invention. The assignee reserves all other available copyrights in the listing including the right to reproduce the listing as part of a computer program that is in machine-executable form.

2b. Cross Reference to Related Other Publications

The following publication(s) is/are believed to be related to the present application and is/are cited here for purposes of reference:

(a) PCI Local Bus Specification, Revision 2.0, Apr. 30, 1993; available from PCI Special Interest Group, 5200 N. E. Elam Young Parkway, Hillsboro, Oreg. (USA) 97124; and (b) Verilog-XL™ Reference Manual, Version 1.6, March 1991, available from Cadence Design Systems Inc.

2c. Trademark Acknowledgements

VerilogHDL is a trademark of Cadence Software of San Jose, Calif.

Ethernet is a trademark of the Xerox Corporation.

MicroChannel is a trademark of International Business Machines (IBM), Armonk, N.Y.

TRISTATE is a trademark of National Semiconductor, of Sunnyvale, Calif.

Use of these or other trademarks herein does not constitute a claim by the assignee of this application to such marks.

3. Description of the Related Art

Bus master architectures are becoming increasingly popular as a means for the rapid exchange of digital data between data processing and/or transceiving units.

The Small Computer Standard Interface (SCSI) is an example of an industry-standard data exchange architecture in which a form of bus mastering takes place. As many as eight devices can be simultaneously connected to a SCSI bus. One of the eight devices (the bus master) takes control of the shared bus and dictates the direction and routing of a data exchange between itself and another device (target device) on the bus.

Although they are highly popular, the SCSI-1 and SCSI-2 data exchange protocols suffer the problem of not having sufficient bandwidth for voluminous, high-speed data exchanges. The data throughput rate of a SCSI communication channel is constrained by the relatively large, maximum length (approximately 10 meters) that is allowed for SCSI-compliant buses and by the relatively slow pulse rise time (approximately 35 nanoseconds) dictated by line termination specifications.

There is a growing demand in the industry for a data exchange standard that supports a substantially wider communications bandwidth. Part of the demand is owed to an increasing popularity of multimedia applications wherein animated video and sound signals are transmitted and processed together in real-time. Another part of the demand comes from increased reliance on multi-processor systems in which plural data processors are tied together by a high-speed local area network (LAN) such as Ethernet. Yet a further aspect of the growing demand for greater bandwidth arises from continued improvements in the resolution of graphics display systems.

A recently introduced, "PCI local bus" standard promises to expand the data throughput rate of so-called personal computers by a substantial amount. Adoption of the PCI local bus standard is expected to enable high-speed multimedia activities and other operations requiring wide bandwidth. (PCI stands for Peripheral Component Interconnect and the standard is specified by the PCI Special Interest Group of Hillsboro, Oreg. (USA).)

The PCI local bus features a 32-bit wide, multiplexed address-data (AD) bus portion capable of operating at up to 132 megabytes per second (132 MB/s peak). An already-defined, performance upgrade path allows for expansion to a 64-bit wide AD bus portion capable of operating at up to 264 MB/s peak.

PCI bus access is based on arbitration between contending agents. Each device (agent) that wants to be a bus-master issues a bus-master request (REQ#) to a central arbiter. The central bus arbiter returns an active bus-grant (GNT#) signal to the winner. The arbitration scheme can be based on a rotating priority or on another fair scheme.

A large number of devices (agents) may be found simultaneously contending for access to a PCI local bus in a high performance computer system. Examples of such potential contenders include, but are not limited to, a SCSI adaptor module, an Ethernet interface module, a CPU-to-memory bridge unit, a motion video processing unit, a sound processing unit, and an expansion bus interface unit (e.g., an EISA-to-PCI interface).

A problem develops when designers want to couple more than a few devices (e.g., more than 10 "loads") to a PCI local bus. The high data throughput rate of the PCI local bus is due in part to a fixed limitation that is placed on the number of electrical AC and DC "loads" that can be attached to the bus while still maintaining peak performance (e.g., a 33 MHz clock rate). The speed of the PCI local bus is owed in further part to another limitation that is placed on the physical length and on the capacitance of the conductor traces and connection pins that define the bus. Each PCI "load" typically has a capacitance of between 15 to 25 picofarads (15–25 pF) per pin. The electrical-load, capacitance, and physical-size parameters of a PCI-compliant bus have to be jointly configured in order to assure a clock skew of less than a prespecified first amount (2 nS) for synchronous operations between any two bus devices and a data signal propagation time of less than a second prespecified amount (10 nS). Thus there are physical and electrical constraints which limit the number of attachment slots and input/output buffers that may be provided along a PCI local bus.

Current technology appears to allow for no more than four expansion slots on any one PCI local bus. Each combination of a conventional expansion connector plus a conventional expansion board consumes two "loads". Each IC chip that connects directly to the PCI local bus consumes one "load". The PCI local bus is allowed no more than 10 loads under current specifications. Thus, four expansion slots and one direct-connect IC consume 9 of the 10 allowed loads. It appears that the number devices that designers may soon wish to attach to the PCI bus will quickly exceed the 10 load maximum. A need is developing within the industry for being able to couple many different device drivers such as SCSI, Ethernet, real-time audio/video, cache memory, expansion buses such as EISA, VESA or MicroChannel, and so forth onto the PCI local bus or onto a like, load-and-size constrained local bus, while giving each attached device an appropriate opportunity to act as a bus-master.

SUMMARY OF THE INVENTION

The invention overcomes the above-mentioned problems by providing an apparatus and method for integrating bus master ownership of a single local bus load by plural data transceivers.

Such an arrangement can be used to advantageously reduce the electrical loading and conductor length of a PCI or like local bus.

An integrated circuit is provided in accordance with the invention having: (a) a first plurality of local bus interface terminals for connecting to a local bus (e.g., PCI); (b) a second plurality of interface terminals for connecting to a first external communications channel (e.g., SCSI); (c) a third plurality of interface terminals for connecting to a second external communications channel (e.g., Ethernet); (d) a local bus interface means, connected to the first plurality of local bus interface terminals, for interfacing with the corresponding local bus and thereby applying a predefined load to the local bus; (e) a signal multiplexing means, operatively coupled to the local bus interface means, to the first communications channel (SCSI), and to the second communications channel (Ethernet), for selectively routing signals between the local bus interface means and a selected one of the first and second external communications channels (e.g., SCSI or Ethernet); and (f) an interface ownership designating means, operatively coupled to the multiplexing means, for designating one of the first and second communications channels (e.g., SCSI or Ethernet) as a current-owner of the local bus interface means and for controlling the multiplexing means to route signals between the local bus interface means and the designated current-owner of the local bus interface means.

A system in accordance with the invention comprises a printed circuit board on which there is mounted the above-defined integrated circuit and a local bus-arbiter. The integrated circuit includes a set of bus-master request and grant terminals coupled to the local bus-arbiter. A single request-grant pair may be used for allowing both the first and second external communications channels (e.g., SCSI or Ethernet) to exchange data with the local bus (e.g., PCI).

A method in accordance with the invention comprises the steps of: (a) first manufacturing a computer with a downgraded version of the PCI-compliant IC chip installed therein; and (b) afterwards replacing the downgraded version with a full-function version (integrated SCSI and Ethernet) of the PCI-compliant IC chip.

BRIEF DESCRIPTION OF THE DRAWINGS

The below detailed description makes reference to the accompanying drawings, in which.

DETAILED DESCRIPTION

Figure 1:
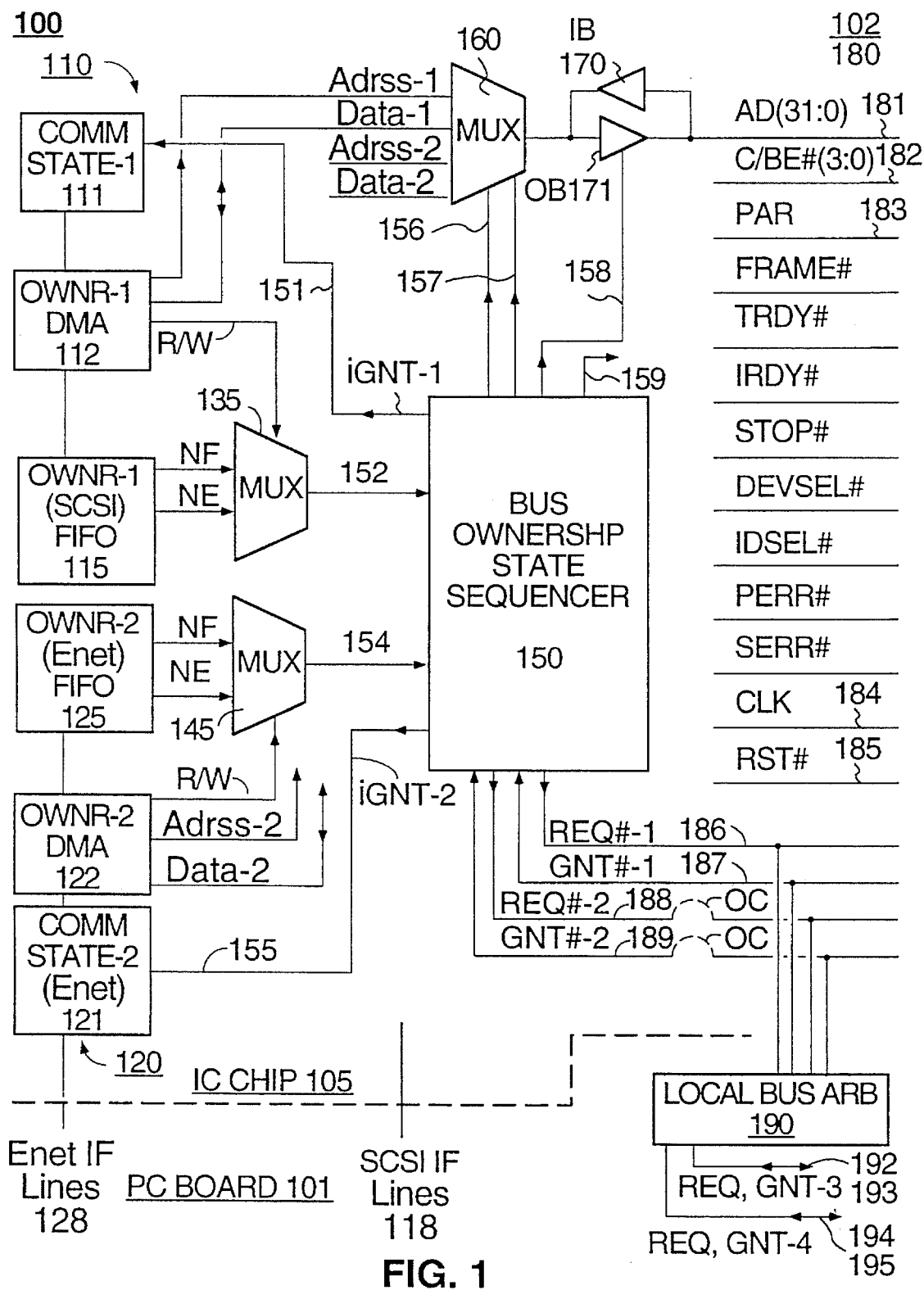
FIG. 1 is a block diagram of a computer system in accordance with the invention that includes a PCI-compliant IC chip connectible to both a SCSI interface and an Ethernet interface.

FIG. 1 shows a block diagram of a computer system 100 in accordance with the invention.

Computer system 100 includes a printed circuit board (PC Bd.) 101 on which there is provided a set of conductive traces defining a PCI local bus 102 and on which there is further provided, a PCI-compliant integrated circuit chip 105.

Figure 3:
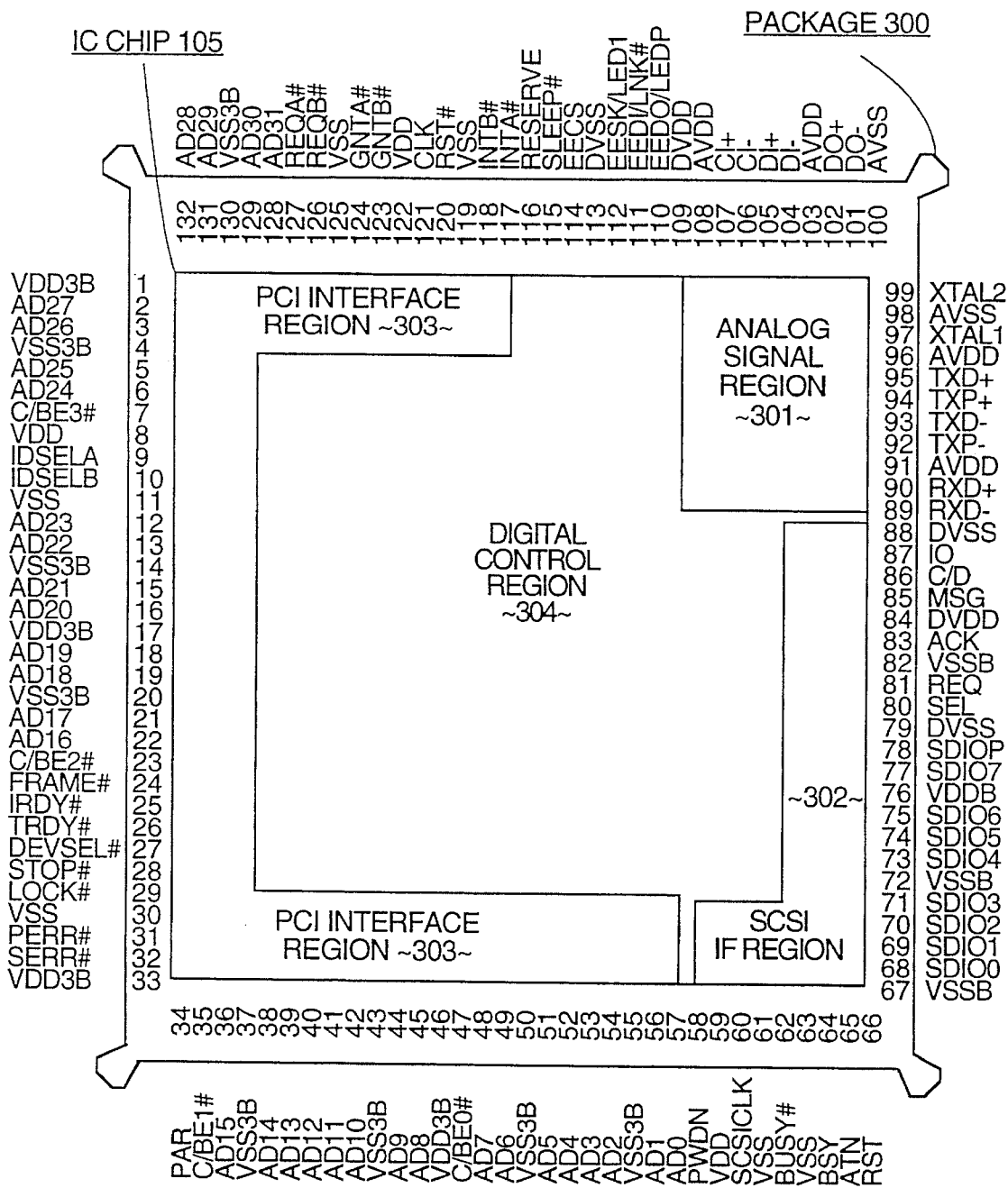
FIG. 3 is a top plan view of a packaging pinout for a PCI-compliant IC chip in accordance with the invention that also provides integrated connectivity to a SCSI bus and to an Ethernet cable.

The pinout and internal layout of IC chip 105 is illustrated in FIG. 3. IC chip 105 is preferably packaged in a 132-pin PQFP package 300. And the physical pinout is preferably as shown. The die area of chip 105 is subdivided physically, and in terms of power distribution, into: (a) an analog signal region 301 that contains analog circuits for supporting analog signal processing (e.g., such as used in the transmission and receipt of Ethernet signals); (b) a SCSI interface region 302 that contains input and output buffers for respectively receiving and outputting SCSI bus signals; (c) a PCI interface region 303 that contains input and output buffers for respectively receiving and outputting PCI local bus signals; and (d) a digital control core region 304 that contains digital control logic.

Referring to FIG. 1, the IC chip package 300 includes a first plurality of PCI-interface pins 180 that connect directly to the printed circuit traces of the PCI local bus 102. While not shown, it is to be understood that the printed circuit board 101 of FIG. 1 can include one or more PCI-compliant expansion connectors attached to the PCI local bus 102 for enabling disconnective coupling of PCI-compliant expansion boards to the PCI local bus 102. It is to be further understood that the printed circuit board 101 can have a CPU (central processing unit) and memory (e.g., DRAM) mounted thereon for defining a microcomputer system thereon and that the printed circuit board 101 can further have one or more oscillator crystals mounted thereon for establishing frequencies of various clock signals. Typically, the CPU and its high speed memory will be connected by way of a PCI bridge circuit directly to the traces of the on-board PCI local bus 102.

The PCI pins 180 of IC chip 105 are respectively labeled in FIG. 1 according to standard PCI specifications as: AD{31:0}, C/BE#{3:0}, PAR, FRAME#, TRDY#, IRDY#, STOP#, DEVSEL#, IDSEL#, PERR#, SERR#, CLK, and RST#. The designations, REQ#-1 (pin reference number 186) and GNT#-1 (pin 187), correspond to the REQ# and GNT# terminals of a first PCI-compliant, bus-mastering device. The designations, REQ#-2 (pin 188) and GNT#-2 (pin 189), correspond to the REQ# and GNT# terminals of a second PCI-compliant, bus-mastering device.

The AD{31:0}designation represents a set of 32 IC pins (pins group 181) and a corresponding set of 32 printed circuit board traces which carry PCI address and data signals in time multiplexed fashion. The C/BE{3:0} designation represents a set of 4 IC pins (pins group 182) and a corresponding set of 4 printed circuit board traces which carry PCI command and byte-enable signals in time multiplexed fashion. The PAR designation represents one IC pin (pin 183) and a corresponding one printed circuit board trace which carry the PCI parity bit signal. Similarly, each of the designations: FRAME#, TRDY#, IRDY#, STOP#, DEVSEL#, IDSEL#, PERR#, SERR#, CLK (pin 184), and RST# (pin 185), represents a pin of IC chip 105 and a corresponding printed circuit board trace that carries the corresponding PCI signal.

In addition to the PCI pins, the PCI-compliant IC chip 105 has a plurality of SCSI-interface pins and lines 118 extending outwardly therefrom for direct connection to a SCSI bus and a plurality of Ethernet-interface pins/lines 128 extending therefrom for connection to an Ethernet isolation transformer (or Ethernet "transceiver module" as it is otherwise known, not shown) which then connects directly to an Ethernet cable via an Ethernet connector (not shown).

A PCI bus-arbiter 190 is provided on the printed circuit board 101 and coupled to a plurality of bus-master request (REQ#) and grant (GNT#) lines of the PCI local bus 102. In this particular implementation, the bus-arbiter 190 provides impartial grants on a rotating priority basis to as many as four requesters. Accordingly, the bus-arbiter 190 has four request input lines (186, 188, 192 and 194) and a corresponding four grant output lines (187, 189, 193, 195). If requests are simultaneously asserted on all four REQ# lines of the bus-arbiter 190, the bus-arbiter 190 will grant successive time slots of equal length to each of the requesting devices.

The PCI-compliant IC chip 105 has four arbitration handshaking pins respectively denoted as REQ#-1 (186), GNT#-1 (187), REQ#-2 (188), and GNT#-2 (189). Each REQ# pin (186,188) has a tristate output buffer (not shown) provided within the IC chip 105 for asserting the corresponding request by pulling its pin to logic low (e.g., ground) in accordance with the PCI local bus specifications. (The pound symbol "#" is used here as a suffix in naming signals that are asserted by pulling their lines low.) Each GNT# pin (187,189) has a corresponding input buffer (not shown) provided within the IC chip 105 for receiving the corresponding grant signal. The PCI local bus 102 can operate in either a 5 V mode or a 3.3 V mode, and the PCI input/output buffers (IB's and OB's) of the IC chip 105 are accordingly designed so that they can be configured to operate in either voltage mode (5 V or 3.3 V).

The PCI-compliant IC chip 105 is further configurable to function in either a first external-arbitration mode where chip 105 asserts a request signal on only the REQ#-1 line (through pin 186) or in a second arbitration mode where chip 105 asserts, on a mutually exclusive basis, request signals on both the REQ#-1 line and the REQ#-2 line (through respective pins 186 and 188).

When the first external-arbitration mode (MODE-1) is active, the PCI-compliant IC chip 105 appears as a single bus-mastering device to the local bus-arbiter 190 and optional connections (OC's) of the REQ#-2 line to chip pin 188 and of the GNT#-2 line to chip pin 189 are not made. In such a case, the REQ#-2 and GNT#-2 lines of local bus-arbiter 190 can be used to service another PCI bus-mastering agent (not shown). A user-programmable, on-chip configuration section (see FIG. 2) determines whether the IC chip 105 is in arbitration MODE-1 or MODE-2.

When the second external-arbitration mode (MODE-2) is active, the PCI-compliant IC chip 105 appears as two independent bus-mastering devices to the local bus-arbiter 190 and the optional connections (OC's) of the REQ#-2 line to chip pin 188 and of the GNT#-2 line to chip pin 189 are made.

In either case, whether arbitration MODE-1 or MODE-2 is active, the IC chip 105 appears as a single "load" to the remainder of the PCI local bus 102 as will be understood shortly.

A Bus-interface Ownership State Sequencer module (BOSS module) 150 is provided within IC chip 105 for asserting either the REQ#-1 signal (in MODE-1) or both the REQ#-1 and REQ#-2 signals (on a mutually exclusive basis in MODE-2) onto the external PCI bus 102, and correspondingly receiving from the external PCI bus 102, the GNT#-1 signal (by way of IC pin 187) and GNT#-2 signal (by way of IC pin 189).

The BOSS module 150 has a set of "chip-internal" request and grant line pairs, 151–152 and 154–155, which are used for carrying out handshaking within IC chip 105 between the BOSS module 150 and a corresponding set of communication channel transceiver units 110–120. Transceiver units 110–120 connect to a corresponding set of communications channels (e.g., SCSI and Ethernet).

Figure 2:
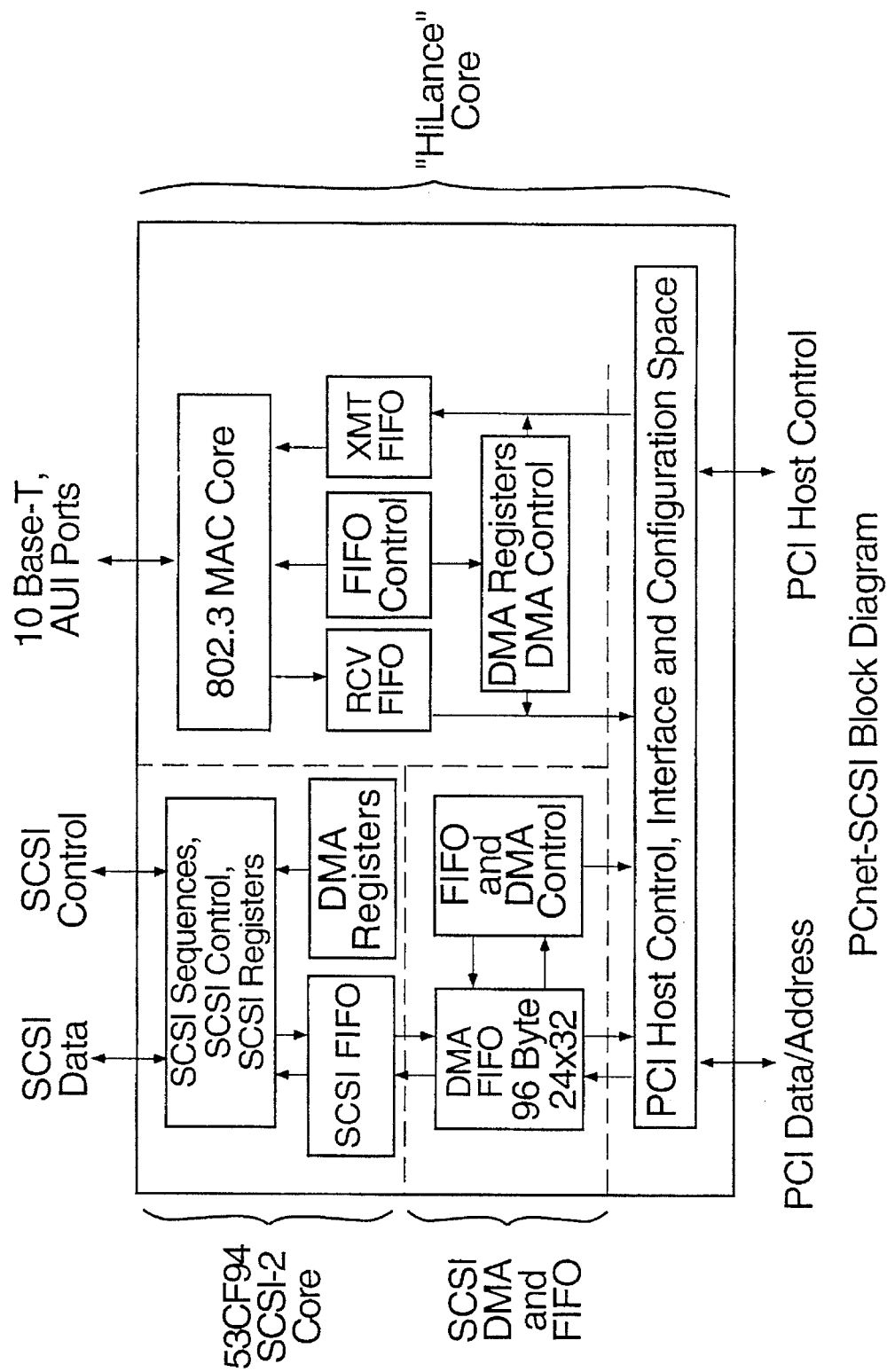
FIG. 2 is a functional diagram of a PCI-compliant IC chip in accordance with the invention.

Data transceiver units 110–120 can be of many different types (e.g., SCSI, Ethernet, ISDN, FDDI, RS232, IEEE 488, etc.). The number of such transceiver units can be more than the illustrated two. In the particular implementation 100 of FIG. 1, however, a first of the communication-channel transceiver units is a SCSI communications controller unit 110 that interfaces with a standard SCSI bus by way of SCSI-interface lines 118. And a second of the data transceiver units is an Ethernet communications controller unit 120 (including an AUI and an MAU) that interfaces with a standard Ethernet cable by way of a Ethernet-interface lines 128 and an isolation transformer (not shown). Both controllers, SCSI and Ethernet, are integrally defined within the one PCI-compliant IC chip 105. The functional organization of this arrangement is shown in FIG. 2.

The on-chip, SCSI communications controller unit 110 (FIG. 1) is also referred to herein, for sake of generality as "OWNER-1" or "OWNER-a". The OWNER-1 controller unit 110 includes a corresponding first communications state sequencer 111 (a 53CF94 compatible SCSI-2 core circuit) that handles the various peculiarities of communications on the SCSI bus side.

Controller unit 110 (OWNER-1) further includes a first DMA-controlled FIFO 115 for temporarily storing and transferring digital data as the data moves between the first communications state sequencer 111 and the PCI local bus 102. A "FIFO," as understood by those skilled in the art, is a First-In, First-Out data storage device which, as well known in the art, is used for transferring data between synchronous modules operating under independent clocks. The FIFO acts as an accordion of sorts, absorbing data bursts from one side at a first transfer rate (and/or phase) and unloading the data bursts to the other side at a second transfer rate (and/or phase), when access becomes available.

FIFO 115 has a Near-Full (NF) status line for indicating when the FIFO is about to overflow and a Near-Empty (NE) status line for indicating when the FIFO is about to experience an underflow condition. As seen in FIG. 1, the NF and NE status lines of FIFO 115 connect to respective inputs of a first, internal-request generating multiplexer 135. Multiplexer 135 outputs a iREQ-1 signal (152) to the BOSS module 150. A read/write direction line (R/W) connects to the selection terminal of multiplexer 135 to select the NF (near-full) status signal when data is supposed to be flowing from FIFO 115 (the SCSI FIFO) to the PCI local bus 102 and to select the NE (near-empty) status signal when data is supposed to be flowing in the other direction, from the PCI local bus 102 to FIFO 115 (the SCSI FIFO).

Controller unit 110 (OWNER-I) also includes a first DMA-controller 112 for bidirectionally transferring data (Data-1) between the OWNER-1 FIFO (SCSI FIFO) 115 and the PCI local bus 102 by way of a bidirectional AD multiplexer 160. Transfer direction is indicated by the R/W signal that is output from the first DMA-controller 112 to the internal-request generating multiplexer 135.

The AD multiplexer 160 receives data from the PCI local bus 102 by way of an AD input buffer 170 (IB 170) and outputs data to the PCI local bus 102 by way of an AD output buffer 171 (OB 171). It is to be understood that the illustrated AD input buffer 170 represents 32 individual input amplifiers coupled to the respective 32 AD bus-lines 181 and that the illustrated AD output buffer 171 represents 32 individual tristate drivers whose outputs are also respectively coupled to the 32 AD bus-lines 181.

The first DMA-controller 112 sends address signals (Adrss-1), corresponding to a given data set (Data-1), by way of the Ad multiplexer 160, and the Ad multiplexer 160 outputs the address information to the PCI local bus 102 by way of the AD output buffer 171. The timing of this address transfer is controlled by a set of owner and phase control signals, 156 and 157, sent to the selection control inputs of AD multiplexer 160 from the BOSS module 150. The owner and phase control signals, 156 and 157, also define the time slots during which data transfers (read or write) take place between the AD bus lines 181 and the OWNER-1 FIFO 115 (the SCSI FIFO).

The on-chip, Ethernet communications controller unit 120 (FIG. 1) is also referred to herein, for sake of generality as "OWNER-2" or "OWNER-b". The OWNER-2 controller unit 120 includes a corresponding first communications state sequencer 121 (an 802.3 compatible Media Access Control core circuit) that handles the various peculiarities of communications on the Ethernet bus side.

Controller unit 120 (OWNER-2) further includes a second DMA-controlled FIFO 125 for temporarily storing and transferring digital data as the data moves between the second communications state sequencer 121 and the PCI local bus 102. FIFO 125 has a Near-Full (NF) status line for indicating when the FIFO is about to overflow and a Near-Empty (NE) status line for indicating when the FIFO is about to experience an underflow condition. As seen in FIG. 1, the NF and NE status lines of FIFO 125 connect to respective inputs of a second, internal-request generating multiplexer 145. Multiplexer 145 outputs a iREQ-2 signal (154) to the BOSS module 150. A read/write direction line (R/W) connects to the selection terminal of multiplexer 145 to select the NF (near-full) status signal When data is supposed to be flowing from FIFO 125 (the Ethernet FIFO) to the PCI local bus 102 and to select-the NE (near-empty) status signal when data is supposed to be flowing in the other direction, from the PCI local bus 102 to FIFO 125. Controller unit 120 (OWNER-2) also includes a second DMA-controller 112 for bidirectionally transferring data (Data-2) between the OWNER-2 FIFO (SCSI FIFO) 125 and the PCI local bus 102 by way of the bidirectional AD multiplexer 160. The second DMA-controller 112 sends address signals (Adrss-2), corresponding to a given data set (Data-2), by way of the AD multiplexer 160, and the AD multiplexer 160 outputs the address information to the PCI local bus 102 by way of the AD output buffer 171. The timing of this address transfer is controlled by the owner and phase control signals, 156 and 157, sent to the selection control inputs of AD multiplexer 160 from the BOSS module 150. The owner and phase control signals, 156 and 157, also define the time slots during which data transfers (read or write) take place between the AD bus lines 181 and the OWNER-2 FIFO 125 (the SCSI FIFO).

In the illustrated example, the OWNER-2 FIFO 125 (the Ethernet FIFO) is 128 bytes long while the OWNER-1 FIFO 115 (the SCSI FIFO) is 96 bytes long. It is to be understood, however, that other FIFO lengths may be used in accordance with the die area available on IC chip 105 and in accordance with the worst-case data transfer rate and phase differences expected between the PCI local bus 102 and the respective, secondary communication channels, 118 and 128.

The BOSS module 150 can designate either the SCSI communications controller unit 110 or the Ethernet communications controller unit 120 as being the "current OWNER" of the on-chip interface to the PCI local bus 102. Respective input and output buffers, 170 and 171, define part of this on-chip interface. (It is understood that in a more general sense, one of the transceiver units in a set of two or more communication channel transceiver units 110–120 is designated as the "current OWNER" of the on-chip interface to the external local bus 102.)

When a particular data transceiver unit of set 110–120 is designated as the "current OWNER", the BOSS module 150 sets the Owner selection input 156 (OwnerSel) of the AD multiplexer 160 to select the corresponding address output bus (Adrss-1 or Adrss-2) and data transfer bus (Data-1 or Data-2) of the designated current-owner.

Although not shown (due to space limitations on the drawing sheet), it is understood that IC chip 105 includes additional on-chip multiplexers like MUX 160 and additional input/output buffers (local-bus interface means) like IB 170 and OB 171 that are operatively coupled to respective ones of the remaining PCI interface pins: C/BE#{3:0}, PAR, FRAME#, TRDY#, IRDY#, STOP#, DEVSEL#, IDSEL#, PERR#, SERR#, CLK, and RST#. The Owner selection signal 156 output from the BOSS module 150 is coupled to these other multiplexers (not shown) for routing the respective PCI interface signals between the PCI local bus 102 and the controller (110–120) of the designated current-owner. The time slots of time-multiplexed fields is designated by corresponding phase control signals such as 157 that are output from the BOSS module 150. By way of example, there is a C/BE multiplexer (not shown) within IC chip 105 that is used to selectively route command and byte-enable data from the controller (110–120) of the designated current-owner to the C/BE bus lines 182. Selection of the command or byte-enable data is carried out by corresponding phase control lines. Activation of tristate output drivers is carried out by corresponding OEN lines such as 158. The phase and OEN lines that extend from the BOSS module 150 to the unshown multiplexers and tristate output drivers are represented by output 159.

To obtain current-ownership, the respective one of the plural data transceiver units 110–120 has to first send an internal request (iREQ-1 or iREQ-2) to the BOSS module 150. The BOSS module 150 then gives, depending on the state of a state sequencer within the BOSS module 150, current-ownership of the on-chip interface to the earlier requesting data transceiver unit 110–120 if the interface is not already owned. The BOSS module 150 then responsively outputs, depending on the internal state of the BOSS module 150, a corresponding bus-mastering request (REQ#-1 (pin 186) or REQ#-2 (pin 188)) to the off-chip, central bus-arbiter 190.

Upon receipt of a corresponding grant (GNT#-1 (pin 187) or GNT#-2 (pin 189)) from the off-chip, central bus-arbiter 190, the BOSS module 150 activates the PCI output buffers (OB's such as 171) by sending respective output enable (OEN) signals to the tristate control terminals of the respective tristate drivers.

The received external grant (GNT#-1 (pin 187) or GNT#-2 (pin 189)) is at the same time routed to the corresponding owner (e.g., 110 or 120) as an internal grant (iGNT-1 or iGNT-2) and this initiates a corresponding data transfer control sequence within the DMA controller (112 or 122) of the interface owner receiving such an internal grant. Thus, the current-owner gains access to the on-chip PCI interface and is able to define the address and data signals that pass on the AD bus lines 181 of the PCI local bus 102; and is further able to define the command and byte-enable signals that pass on the C/BE bus lines 182 of the PCI local bus 102; and so-forth.

One of the important things to note from this arrangement is that the local-bus interface means (e.g., PCI input buffers 170 and output buffers 171) represent a single "load" to the PCI local bus 102, and yet they provide access to two independent, event-driven, communication channels (e.g., SCSI and Ethernet). Another important feature to note is that the coupling of the plural, independent, communication channels (e.g., SCSI and Ethernet) does not consume a substantial portion of the limited physical length available along the PCI local bus 102. The remaining physical length of the PCI local bus is therefor made available for use by expansion slots or other on-board loads. Also, because the coupling of the plural, independent, communication channels (e.g., SCSI and Ethernet) to the PCI local bus 102 is made through, essentially a single integrated circuit chip, the cost of implementing such a connection can be greatly reduced when IC chip 105 is mass produced and placed on the motherboard of a personal computer or on an insertable daughter board.

The internal configuration of the BOSS module 150 is described here by the below-included VerilogHDL™ listing. Those skilled in the art will recognize that the listing can be compiled by an appropriate circuit generator program (e.g., a logic synthesizer such as the DesignCompiler available from Synopsys of Mountain View, Calif.) to define the gate level and transistor level implementation of the functions called forth in the listing.

The following preface notes will help in the understanding of the following VerilogHDL listing: the listing name "GNTAFQ" corresponds to both the GNT#-1 signal (pin 187) of FIG. 1 and the internal grant iGNT-1 (151) of FIG. 1 (they are logically identical in this implementation.) Similarly, the listing name "GNTBFQ" corresponds to both the GNT#-2 signal (pin 189) of FIG. 1 and the internal grant iGNT-2 (155) of FIG. 1 (they are logically identical in this implementation.) The listing names "DREQA" and "DREQB" correspond respectively to the chip-internal request lines, iREQ-1 (152) and iREQ-2 (154) of FIG. 1.

The listing names "REQAF_OEN" and "REQBF_OEN" correspond respectively, but inversely, to the direct request lines, REQ#-1 (pin 186) and REQ#-2 (pin 188) of FIG. 1. The on-chip output buffers that drive the direct request lines, REQ#-1 (pin 186) and REQ#-2 (pin 188) are tristate drivers whose inputs are tied low (to ground). The "REQAF_OEN" and "REQBF_OEN" signals are respectively applied to the output enable terminals of these tristate drivers in order to assert the low-true REQ# signals.

Each of the below listing names that ends in "_OEN" or "_OE" is understood to be an output enable for a tristate driver. Each of the below listing names that has the phrase "_PHASE" within its ending is understood to be time multiplexing control signal that defines when the corresponding data or address signal is to asserted on the respective time-multiplexed bus (e.g., on the AD bus portion 181). The term "hilance" refers to Ethernet related signals. When OWNA is true, it means the SCSI communications controller unit 110 is the current-owner of the local bus interface. When OWNB is true, it means the Ethernet communications controller unit 120 is the current-owner of the local bus interface.

The dual-ampersand symbol "&&" indicates a logical AND operation. The dual vertical-bar symbol "||" indicates a logical OR operation. The exclamation symbol "!" indicates a logical NOT operation.

The triple equate symbols "===" below may have to be replaced with double equate symbols "==" to avoid syntax errors in some design-compilers.

---

HARDWARE DESCRIPTOR LANGUAGE DEFINITION OF BOSS MODULE

```
//
module PCIMSTSTM(
    // inputs
    RSTF_I,           // reset from system
    CLK_I,            // bus clock
    IRDYF_I,          // initiator ready
    TRDYF_I,          // target ready
    STOPF_I,          // stop
    DEVSELF_I,        // device select
    FRAMEF_I,         // cycle frame
    LOCKF_I,          // lock
    GNTAFQ,           // bus grant to master a
    GNTBFQ,           // bus grant to master b
                      // state machine internal inputs
    DREQA,            // dma request from master a
    DREQB,            // dma request from master b
    READYA,           // ready to transfer data from master a
    READYB,           // ready to transfer data from master b
    DEV_TO,           // devsel time out
```

HARDWARE DESCRIPTOR LANGUAGE DEFINITION OF BOSS MODULE

```
        CYCLEND,              // current access in last data phase
        MWR,                  // master write
        MRD,                  // master read
        LOCK_OP,              // locked operation
// outputs
        MAD_OE,               // multiplexed address and data enable
        MPAR_OE,              // parity output enable
        MPERRF_OE,            // parity error output enable
        FRAMEF_O,             // cycle frame
        FRAMEF_OEN,           // cycle frame output enable
        CBEF_OEN,             // bus command and byte enable
        LOCKF_O,              // lock
        LOCKF_OEN,            // lock output enable
        IRDYF_O,              // initiator ready
        IRDYF_OEN,            // initiator ready output enable
        REQAF_OEN,            // bus request from master a
        REQBF_OEN,            // bus request from master b
                              // state machine internal outputs
        OWNA,                 // master a owns the bus
        OWNB,                 // master b owns the bus
        MADDR_PHASE1,         // master address phase, original 1 clk width
        MADDR_PHASE,          // master address phase, earlier, 2 clk width
        SMADDR_PHASE1,        // scsi master address phase, 1 clk width
        SMADDR_PHASE,         // scsi master address phase, 2 clk width
        HMADDR_PHASE,         // hilance master address phase, 2 clk width
        MDATA_PHASE,          // master data phase
        SMDATA_PHASE,         // scsi master data phase
        HMDATA_PHASE,         // hilance master data phase
        SMABORT,              // scsi master abort
        STABORT,              // scsi target abort
        HMABORT,              // hilance master abort
        HTABORT               // hilance target abort
);
input RSTF_I, CLK_I, IRDYF_I, TRDYF_I, STOPF_I, DEVSELF_I, FRAMEF_I, LOCKF_I;
input DEV_TO,CYCLEND,MWR,MRD,LOCK_OP;
input GWAFQ,DREQA,RFADYA;
input GNTBFQ,DREQB,READYB;
output REQAF_OEN,REQBF_OEN;
output MAD_OE, MPAR_OE, MPERRF_OE, FRAMEF_O, FRAMEF_OEN, CBEF_OEN, LOCKF_O,
            LOCKF_OEN;
output IRDYF_O,IRDYF_OEN,OWNA,OWNB;
output MADDR_PHASE1,MADDR_PHASE,SMADDR_PHASE1,SHADDR_PHASE,HMADDR_PHASE;
output MDATA_PHASE,SMDATA_PHASE,HMDATA_PHASE,SHABORT,STABORT,HMABORT,HTABORT;
reg STEP,MPAR_OE,MPERRF_OEPRE1,MPERRF_OE,L,_STOPF,LOCK_XFD;
reg OWNA,OWNB,OWN LOCK,LOCKF_OE,LS_TAR,FRAMEFIX;
reg MST_TO, TABORT, OWNA1Q, OWNB1Q, SMDATA_PHASE1, HMDATA_PHASE1;
wire MPAR_OEPRE,MPERRF_OEPRE2;
wire FRAMEF_OE,CBEF_OE,LRDYF_OE;
wire MABORT;
wire OWNA0,OWNA1D,OWNB0,OWNB1D,OWN_LOCK0,OWN_LOCK1,LOCKF_OEO,LOCKF_OE1;
wire FRAMEFI,IRDYFI,TRDYFI,DEVSELFI,STOPFI,LOCKFI;
wire BUS_PARK, MST_TOS, SMDATA_PHASE0, HMDATA_PHASE0;
parameter dly = 2;
assign FRAMEFI = ~(FRAMEF_I == 0);
assign IRDYFI = ~(IRDYF_I == 0);
assign TRDYFI = ~(TRDYF_I == 0);
assign DEVSELFI = ~(DEVSELF_I == 0);
assign STOPFI = ~(STOPF_I == 0);
assign LOCKFI = ~(LOCKF_I == 0);
parameter [2:0]     // synopsys enum mst_bus_state
        IDLE        =3'b000,    // idle condition
        DR_BUS      =3,b001,    // bus parked at this agent
        ADDRS       =3'b011,    // master start as access
        M_DATA      =3,b010,    // master transfer data
        TURN_AR     =3'b110,    // completed transaction
        S_TAR       =3'b111;    // stop asserted, do turn around cycle
parameter [0:0]
        FREE        =1'b0,      // lock# is not owned by others
        BUSY        =1'b1;      // lock# is currently owned by others
reg [2:0]           // synopsys enum mst_bus_state
        mb_state,nmb_state;     // master bus state, next
reg
        ml_state,nml_state;     // master lock state, next
// synopsys state_vector mb_state
always @(posedge CLK_I or negedge RSTF_I)
        if (!RSTF_I) begin
                    mb_state <= #dly IDLE;
                    ml_state <= #dly FREE;
```

HARDWARE DESCRIPTOR LANGUAGE DEFINITION OF BOSS MODULE

```
                            end
        else        begin
                        mb_state <= #dly nmb_state;
                        ml_state <= #dly nml_state;
                    end
always @(mb_state or REQAF_OEN or REQBF_OEN or GNTAFQ or GNTBFQ or FRAMEFI or FRAME
    or IRDYFI or TRDYFI or STOPFI or DEV_TO)
begin
                    STEP = 'b0;
                    nmb_state = IDLE;
case(mb_state)    // synopsys full-case parallel_Case
    IDLE: begin
                    STEP = 'b1;
        if ((!REQAF_OEN && !GNTAFQ || IREQBF_OEN && !GNTBFQ)
            FRAMEFI && IRDYFI && !STEP)
                    nmb_state -- ADDRS;
        else
        if ((REQAF_OEN && !GNTAFQ && REQBF_OEN && !GNTBFQ ||
            (!REQAF_OEN && !GNTAFQ && !REQBF_OEN && !GNTBFQ) && STEP)
            && FRAMEFI && IRDYFI)
                    nmb_state = DR_BUS;
        else
                    nmb_state = IDLE;
        end
    ADDRS: begin
                    nmb_state = M_DATA;
        end
    M_DATA:begin
        if (!FRAMEF_O || FRAMEF_O && TRDYFI && STOPFI && !DEV_TO)
                    nmb_state = M_DATA;
        else
        if (FRAMEF_O && !TRDYFI && STOPFI)
                    nmb_state = TURN_AR;
        else
        if (FRAMEF_O && !STOPFI || FRAMEF_O && DEV_TO)
                    nmb_state = S_TAR;
        end
    TURN_AR:begin
        if ((!REQAF_OEN && !GNTAFQ && !REQBF_OEN && !GNTBFQ) && !STEP)
                    nmb_state = ADDRS;
        else
        if (REQAF_OEN && !GNTAFO || !REQBV_OEN && !GNTBFQ ||
            (!REQAF_OEN && !GNTAFQ || !REQBF_OEN && !GNTBFQ) && STEP)
                    nmb_state = DR_BUS;
        else
                    nmb_state = IDLE;
        end
    S_TAR: begin
        if (!GNTAFQ && !GNTBFQ)
                    nmb_state = DR_BUS;
        else
                    nmb_state = IDLE;
        end
    DR_BUS:begin
        if ((!REQAF_OEN && !GNTAFQ || !REQBF_OEN && !GNTBFQ) && !STEP)
                    nmb_state = ADDRS;
        else
        if ((!REQAF_OEN && !GNTAFQ && !REQBF_OEN && !GNTBFQ) && STEP ||
            REQAF_OEN && !GNTAFO && REQBF_OEN && !GNTBFQ)
                    nmb_state = DR_BUS;
        else
                    nmb_state = IDLE;
        end
    endcase
end
always @(ml_state or LOCKFI or FRAMEFI or OWN_LOCK)
begin
                    nml_state = FREE;
    case(ml_state)    // synopsys full_case parallel_case
    FREE: begin
            if (!LOCKFI && !OWN_LOCK)
                    nml_state = BUSY;
        else
                    nml_state = FREE;
        end
    BUSY: begin
        if (LOCKFI && FRAMEFI)
                    nml_state = FREE;
```

HARDWARE DESCRIPTOR LANGUAGE DEFINITION OF BOSS MODULE

```
                else
                        nml_state = BUSY;
                end
        endcase
end
// LOCK_XFD: Data was transfered during a lock operation
always @[LOCKF_O or IRDYF_O or TRDYFI)
if (!IRDYF_O && !TRDYFI)
        LOCK_XFD = ~LOCKF_O;
assign MADDR_PHASE1 = (mb_state == ADDRS);
assign MADDR_PHASE = (mb_state == DR_BUS) | (mb_state == ADDRS);
assign SMADDR_PHASE1 = HADDR_PHASEI & OWNA;
assign SMADDR_PHASE = MADDR_PHASE & OWNA;
assign HMADDR_PHASE = MADDR_PHASE & OWNB;
assign MDATA_PHASE = (bm_state == K_DATA);
assign SMDATA_PHASE0 = MDATA_PHASE & OWNA;
assign HMDATA_PHASE0 = MDATA_PHASE & OWNB;
always @(negedge RSTF_I or posedge CLK_I)
if (!RSTF_I)
    begin
        SMDATA_PHASE1 <= #dly 'b0;
        HMDATA_PHASE1 <= #dly 'b0;
    end
else
    begin
        SMDATA_PHASE1 <= #dly MADDR_PHASE1 & OWNA;
        HMDATA_PHASE1 <= #dly MADDR_PHASE1 & OWNB;
    end
assign SMDATA_PHASE = SMDATA_PHASE0 | SMDATA_PHASE1;
assign HMDATA_PHASE = HMDATA_PHASE0 | HMDATA_PHASE1;
assign MABORT = (mb_state == M_DATA) & DEV_TO;
always @(posedge CLK_I)
        TABORT <= #dly (mb_state == M_DATA) & ~STOPFI & DEVSELFI & FRAMEF_O &
                        ~IRDYF_O;
assign SMABORT = MABORT & OWNA;
assign STABORT = TABORT & OWNA;
assign HMABORT = MABORT & OWNB;
assign HTABORT = TABORT & OWNB;
assign BUS_PARK = (mb_state == DR_BUS);
assign OWNA0 = FRAMEF_OEN & IRDYF_O & TRDYFI & (REQAF_OEN | GNTAFQ) & ~BUS_PARK
            & ~CLK_I | ~RSTF_I;
assign OWNA1D FRAMEFI & IRDYFI & ~REQAF_OEN & ~GNTAFQ;
always @(posedge MADDR_PHASE1 or posedge CLK_I)
        if (MADDR_PHASE1)
                OWNA1Q <= #dly 'b0;
        else
                OWNA1Q <= #dly OWNA1D;
always @ O(OWNA0 or OWNA1Q or REQAF_OEN or GNTAFQ)
        if (OWNA0)
                OWMA <= #dly 'b0;
else
        if (OWNA1O)
                OWNA <= #dly (~REQAF_OEN | ~GNTAFQ);
assign OWNB0 = FRAMEF_OEN & IRDYF_O & TRDYFI & (REQBF_OEN | GNTBFQ) = ~BUS_PARK
                    & ~CLK_I | ~RSTF_I;
assign OWNB1D = FRAMEFI & IRDYFI & ~REQBF_OEN & ~GNTBFQ;
always @(posedge MADDR_PHASE1 or posedge CLK_I)
        if (MADDR_PHASE1)
                OWNBLQ <= #dly 'b0;
else
                OWNBLQ <= #dly OWNBLD;
always @(OWNB0 or OWNBLQ or REQBF_OEN or GNTBFQ)
        if (OWNB0)
                OWNB <= #dly 'b0;
else
        if (OWNB1Q)
                OWNB <= #dly (~REQBF_OEN | ~GNTBFQ);
assign OWN_LOCK0 = FRAMEF_OEN & LOCKF_O | ~RSTF_I;
assign OWN_LOCK1 = LOCKFI & FRAMEFI & IRDYFI &
                        (~REQAF_OEN & ~GNTAFQ | ~REQBF_OEN & ~GNTBFQ) & LOCK_OP;
always @(OWN_LOCK0 or OWN_LOCK1 or LOCK_OP)
        if (OWN_LOCK0)
                OWN_LOCK <= #dly 'b0;
else
        if (OWN_LOCK1)
                OWN_LOCK <= #dly LOCK_OP;
assign LOCKF_OE0 = FRAMEF_OEN & IRDYF_Q & LOCKF_O | ~RSTF_I;
assign LOCKF_OE1 = OWN_LOCK & (mb_state == M_DATA);
```

HARDWARE DESCRIPTOR LANGUAGE DEFINITION OF BOSS MODULE

```
always @(LOCKF_OE0 or LOCKF_OE1 or OWN_LOCK)
    if (LOCKF_OE0)
        LOCKF_OE <= #dly 'b0;
else
    if (LOCKF_OE1)
        LOCKF_OE <= #dly OWN_LOCK;
assign FRAMEF_OE = (mb_state == ADDRS) | (W_state == M_DATA);
assign CBEF_OE = (mb_state == ADDRS) | (mb_state == M_DATA) |
        (mb_state == DR_BUS);
assign MAD_OE = (mb_state == ADDRS) | (mb_state == M_DATA) & MWR |
        (mb_state == DR_BUS);
assign IRDYF_OE = (mb_state == ADDRS) | (mb_state == M_DATA) |
        (mb_state == TURN_AR) | (mb_state == S_TAR);
assign REQAF_OEN = ~((DREQA & ~LOCK_OP | DREQA & LOCK_OP & (ml_state == FREE)) &
        (~((mb_state == S_TAR) | LS_TAR)));
assign REQBF_OEN = ~((DREQB & ~LOCK_OP | DREQB & LOCK_OP & (ml_state == FREE)) &
        (~((mb_state == S_TAR) | LS_TAR)));
assign MPAR_OEPRE = (mb_state == DR_BUS) | (nb_state == ADDRS) |
        (mb_state == M_DATA) & !IRDYF_O & MWR;
assign MPERRF_OEPRE2 = (mb_state == K_DATA) & ITRDYFI & MRD |
        (mb_state == TURN_AR) | (mb_state == S_TAR);
assign FRAMEF_O = ~((&_state == DR_BUS) | (mb_state == ADDRS) |
        (mb_state == M_DATA) & ~DEV_TO & ~FRAMEFIX &
        (~CYCLEND & (~MST_TO | ~GNTAFQ & OWNA | ~GNTBFQ & OWNB)
        L_STOPF | ~READYA & OWNA | ~READYB & OWNB));
assign IRDYF_O = ~((mb_state == M_DATA) &
        (READYA & OWNA | READYB & OWNB | DEV_TO));
assign LOCKF_O = OWN_LOCK & (mb_state == ADDRS) | TABORT | MABORT |
        (mb_state == M_DATA) & ~L_STOPF & TRDYFI & ~LOCK_XFD |
        OWN_LOCK & ~LOCK_DP & CYCLEND & (mb_state == M_DATA) &
        FRAMEF_0 & ~TRDYFI;
always @(posedge CLK_I)
        LS_TAR <= #dly (mb_state == S_TAR);
always @(posedge CLK_I)
        MPAR_OE <= #dly MPAR_OEPRE;
always @(posedge CLK_I)
        MPERRF_OEPRE1 <= #dly MPERRF_OEPRE2;
        MPERRF_OE <= #dly MPERRF_OEPRE1;
always @(posedge CLK_I)
        L_STOPF <= #dly STOPFI;
assign MST_TOS = ~(MDATA_PHASE & MSZ_TO);
always @(negedge MST_TOS or posedge CLK_I)
if (!MS@TOS)
        MST_TO <= #dly 1'b1;
    else
        MST_TO <= #dly (OWNA & GNTAFQ | OWNB & GNTBFQ) & ~TRDYFI;
always @(FRAMEF_OEN or MST_TO)
    if (FRAMEF_OEN)
        FRAMEFIX <= #dly 'b0;
    if (MST-TO)
        FRAMEFIX <= #dly 'b1;
assign FRAMEF_OEN = ~FRAMEF_AE;
assign CBEF_OEN = ~CBEF_OE;
assign LOCKF_OEN = ~LOCKF_OE;
assign IRDYF_OEN = ~IRDYF_OE;
endmodule // PCIMSTSTM
```

Referring to FIG. 3, the IC chip 105 is approximately 300 to 400 mils on each side. A 0.8 micron, double-metal process is used to define its circuitry. The layout of IC chip 105 is subdivided as generally shown in FIG. 3, and better shown in FIG. 4, in order to limit problems associated with combining analog and digital circuits on a single chip. One of the problems with such hybrid IC chips is that switching noise (including ground-bounce) tend to be coupled from the digital section of such a chip to the analog section. The switching noise might lead to erroneous operations in the analog section.

Another patent application is expected to be soon filed having the title, INTEGRATED SCSI AND ETHERNET CONTROLLER ON A PCI LOCAL BUS and naming Chih-Siung Wu as an inventor. (Postscript: SC/Ser. No. 08/186,050; filed Jan. 24, 1994.). This other application will provide details about how the coupling of switching noise between chip sections is reduced.

By way of a brief explanation, separate drain voltage ($V_{DD}$) and source voltage ($V_{SS}$) power lines are routed to each of regions 301–304 shown in FIG. 3 so that ground bounce generated by the simultaneous switching of many output buffers in the PCI interface region 303 and/or in the SCSI interface region 302 is inhibited from altering the operations of the analog signal region 301. The analog signal region 301 is, in essence, maintained as a "quiet zone" that is substantially devoid of ground bounce noise.

As understood by those skilled in the art, ground bounce refers to voltage changes that are induced across inductive power and ground lines due to the L(di/dt) effect. When multiple output buffers simultaneously switch their outputs to low, to sink current from an external source, a sudden and large rush of current can flow from the ground terminals of chip-internal output buffers to the ground terminal of the chip package. Ground bounce is reduced by distributing this flow among a plurality of ground pins ($V_{SS}$) that are evenly distributed about the periphery of the chip package.

Chip package 300 is unique in that the ratio of source voltage ($V_{SS}$) pins to drain voltage ($V_{DD}$) pins is substantially greater than one (roughly equal to two to one). A special set of $V_{SS3B}$ pins and $V_{DD3B}$ pins are provided for supplying either 3.3 V or 5 V operating power to the output buffers of the PCI interface region 303. A separate set of $V_{SSB}$ pins and $VDD_B$ pins are provided for supplying 5 V operating power to the output buffers of the SCSI interface region 302. Yet another independent set of $DV_{SS}$ pins and $DV_{DD}$ pins are provided for supplying 5 V operating power to an Ethernet portion 304a (see FIG. 4) of the digital control core region 304. Another independent set of $V_{SS}$ pins and $V_{DD}$ pins are provided for supplying 5 V operating power to the remainder of the digital control core region 304. And yet another independent set of $AV_{SS}$ pins and $AV_{DD}$ pins are provided for supplying 5 V operating power to the analog signal region 301. A set of back-to-back SCR's (silicon control rectifiers) are intentionally formed between regions 301–304 such that the SCR's will latchup (into a conductive state) and supply power throughout the power distribution networks of regions 301–304 if one of the independently-powered regions 301–304 receives power at the same time that another of the regions 301–304 does not. (For example if one power supply switches on late.) This is done so that no one region can be powered up without simultaneously applying some power to the other regions. Otherwise there is the danger an isolation PN junction will be breached and excessive currents will flow through and damage the chip.

Note that the Ethernet interface pins of FIG. 3 are positioned about one corner of the square-shaped die and the PCI interface pins are positioned about a diagonally-opposed second corner and spaced apart from the Ethernet pins. This is done to limit crosstalk of digital switching noise on the usually-active PCI local bus to the analog circuitry of the less-often active Ethernet lines.

Figure 4:
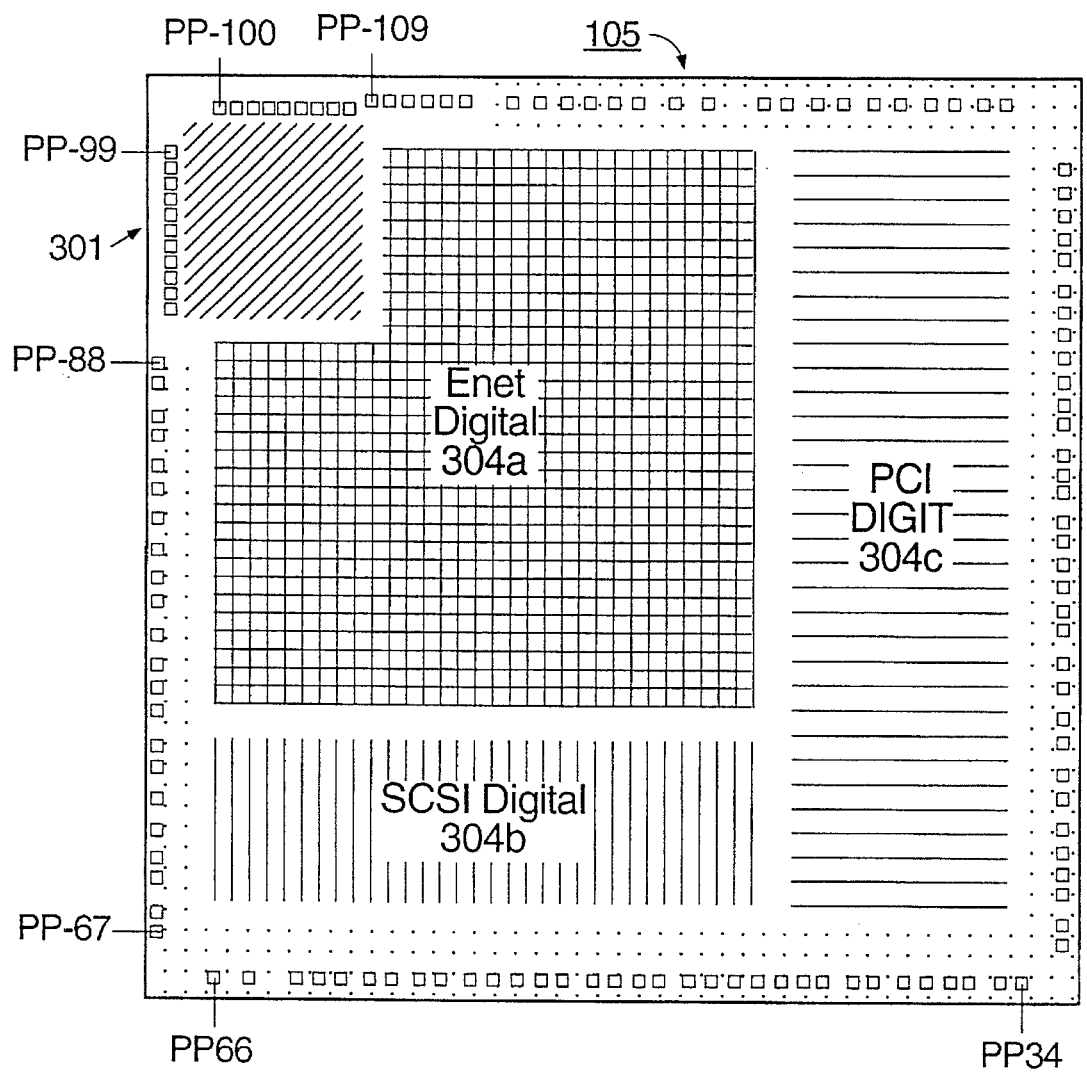
FIG. 4 is a top plan view of a semiconductor circuit layout pinout for a PCI-compliant IC chip in accordance with the invention.

Referring to FIG. 4, the layout of a PCI-compliant IC chip 105 in accordance with the invention is shown to scale. White bands are painted around regions 301, 304a, 304b and 304c to better highlight them. The chip die lays circuit-side down when packaged in package 300. The pinout in FIG. 4 is therefore a mirror image of that shown in FIG. 3. The bonding pad for package-pin number PP-99, for example, near the top along the left edge of the layout shown in FIG. 4 while the corresponding package-pin number PP-99 (XTAL) is position near the top along the right edge of the package pinout shown in FIG. 3.

The combination of the Ethernet analog signal region 301 and the Ethernet digital control region 304a generally defines a square shape in FIG. 4, with region 301 defining at top left quadrant of that square shape. The SCSI digital control region 304b is positioned as a rectangle whose longitudinal side extends below and adjacent to the bottom of the Ethernet digital control region 304a. The PCI digital control region 304c is positioned as a rectangle whose longitudinal side extends to right and adjacent the right sides of both the Ethernet digital control region 304a and the SCSI digital control region 304b.

Digital output buffers are positioned about peripheral edges of digital control regions 304a to 304c. Each output buffer is positioned as close as possible to its corresponding I/O pad and also as close as possible to a corresponding $V_{SS}$ pin so as to minimize lead length and the associated ground bounce.

The basic idea is to minimize the coupling of digital switching noise from high-current, digital, output buffers to those circuits that are most sensitive to such noise (e.g., the Ethernet analog signal region 301). Note in particular that the output buffers that are expected to generate the most switching noise on the most continuous basis; which in this PCI/SCSI/Ethernet embodiment are the PCI A/D and C/BE buffers, are arranged to be positioned as far away as possible from (that is, diagonally opposite from) the circuitry that is most sensitive to such noise; which in this PCI/SCSI/Ethernet embodiment is the Ethernet analog signal region 301.

The PCI output buffers create the most noise because they operate at the highest switching frequencies (e.g., 33 MHz) and each such PCI output buffer both sources relatively large amounts of current (e.g., 44 mA per pin) from within the chip 105 and sinks relatively large amounts of current supplied from outside the chip 105 (from other devices on the PCI local bus). The SCSI output buffers (e.g., those connected to package-pin numbers PP-68 to PP-78), on the other hand, are open-collector and thus do not source large amounts of current from within the chip. The SCSI output buffers do sink relatively large amounts of current, but they also tend to operate at switching frequencies substantially lower than those of the PCI local bus. Current-sourcing noise should be distinguished from noise generated by current sinking mechanisms within the chip 105. The current-sourced portion of switching noise tends to be most troublesome because it can couple from one region (e.g., PCI interface region 303) to another (e,g., Ethernet analog signal region 301) by way of the bulk portion of the substrate (and in particular, by way of the $V_{DD}$ power distribution lines of the IC chip 105). But since the PCI A/D and C/BE output buffers, and their associated pads and power supply lines, are positioned furthest away from the Ethernet analog signal region 301, this type of through-the-bulk noise coupling is minimized.

Current-sink based switching noise is most troublesome in regard to its tendency to create groundbounce. The illustrated chip 105 uses a large proportion of current-sinking, source voltage pins ($V_{SS}$ pins) relative to $V_{DD}$ pins so as to distribute current density through a plurality of many short leads rather than allowing di/dt currents to build to large levels in any one given lead. Where possible, each $V_{SS}$ pin is positioned centrally relative to the group of output buffers it serves so as to minimize inductive lead length. Note for example that the $V_{SS3B}$ pin PP-55 is centered relative to the output buffers that drive the AD0 through AD3 lines of the PCI bus. A separate ground line (not shown) is routed from each of the four output buffers (AD0–AD3) to the central $V_{SS3B}$ pin (PP-55) in order to minimize di/dt current in each. Package-pin number PP-50 functions as the central $V_{SS3B}$ pin for the next four output buffers (AD4–AD7), and so on.

Pin compatible, downgraded versions of the PCI-compliant IC chip 105 can be manufactured and used to enable a simple upgrade procedure. The downgraded versions of the PCI-compliant IC chip 105 include a like PCI-compliant SCSI-only chip that does not include the analog signal region 301 and a like PCI-compliant Ethernet-only chip that does not include the SCSI interface region 302. Such downgraded versions can be laid out on a smaller die area and produced for less cost because mass-production yield tends to increase as die area decreases.

The upgrade procedure comprises the steps of: (a) first manufacturing a computer with a downgraded, but pin-compatible, version of the PCI-compliant IC chip installed therein; and (b) afterwards replacing the downgraded version with a full-function version (integrated SCSI and Ethernet) of the PCI-compliant IC chip 105. Configuration software is installed in each computer and used to appropriately configure the operational modes of the downgraded versions or the full-feature PCI-compliant IC chip 105.

The computer mother or daughter-board is designed with a common layout for both the downgraded versions or the full-feature PCI-compliant IC chip 105. Insertion spaces are provided on the mother/daughter board for adding an Ethernet isolation transformer and a corresponding oscillator crystal when an upgrade is made from PCI and SCSI-only operation to integrated PCI/SCSI/Ethernet operation. Further insertion spaces are provided on the mother/daughter board for adding an Ethernet connector and/or SCSI bus connectors. Then, performance upgrade is a simple mater of replacing the downgraded chip version with the full-function version (integrated SCSI and Ethernet) of the PCI-compliant IC chip 105 and adding a few external components (e.g., Ethernet connector, Ethernet isolation transformer and an optional oscillator crystal) to the printed circuit board as needed.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the claims appended hereto.

What is claimed is:

1. An integrated circuit comprising:
   (a) a first plurality of interface terminals for connecting to an external local bus, the external local bus having associated therewith a prespecified maximum total load that may be present on the external local bus at a given time, said maximum total load defining a maximum data signal propagation time for the external local bus;
   (b) a second plurality of interface terminals for connecting to a first external communications channel;
   (c) a third plurality of interface terminals for connecting to a second external communications channel;
   (d) local bus interface means connected to the first plurality of interface terminals for interfacing with the corresponding local bus and applying a predefined load to the local bus, said predefined load being substantially less than the prespecified maximum total load of the external local bus so as to enable attachment of at least two other loads, each similar to said predefined load, to the external local bus while maintaining a total load on the external local bus that does not exceed the prespecified maximum total load;
   (e) multiplexing means, operatively coupled to the local bus interface means, and to the first communications channel by way of said second plurality of interface terminals, and to the second communications channel by way of said third plurality of interface terminals, for selectively routing signals between the local bus interface means and a selected one of the first and second communications channels; and
   (f) interface ownership designating means, operatively coupled to the multiplexing means, for designating one of the first and second communications channels as a current-owner of the local bus interface means and for controlling the multiplexing means to route signals between the local bus interface means and the designated current-owner of the local bus interface means.

2. An integrated circuit according to claim 1 wherein said external local bus is a Peripheral Component Interconnect (PCI) bus.

3. An integrated circuit according to claim 1 wherein said first external communications channel is a Small Computer Standard Interface (SCSI).

4. An integrated circuit according to claim 3 wherein the integrated circuit further comprises a SCSI communications controller unit operatively coupled to the second plurality of interface terminals.

5. An integrated circuit according to claim 4 wherein the SCSI communications controller unit includes:
   a SCSI communications-channel state-sequencer for sequencing through predefined communication protocols of the SCSI communications channel;
   a SCSI FIFO for temporarily storing and transferring SCSI data; and
   a SCSI DMA-controller for controlling data block transfers between the SCSI FIFO and the local bus interface means.

6. An integrated circuit according to claim 1 wherein said second external communications channel is an Ethernet channel.

7. An integrated circuit according to claim 6 wherein the integrated circuit further comprises an Ethernet communications controller unit operatively coupled to the third plurality of interface terminals.

8. An integrated circuit according to claim 7 wherein the Ethernet communications controller unit includes:
   an Ethernet communications-channel state-sequencer for sequencing through predefined communication protocols of the Ethernet communications channel;
   an Ethernet FIFO for temporarily storing and transferring Ethernet data; and
   an Ethernet DMA-controller for controlling data block transfers between the Ethernet FIFO and the local bus interface means.

9. An integrated circuit according to claim 7 wherein said first external communications channel is a Small Computer Standard Interface (SCSI).

10. An integrated circuit according to claim 9 wherein the integrated circuit further comprises a SCSI communications controller unit operatively coupled to the second plurality of interface terminals.

11. An integrated circuit according to claim 10 wherein the SCSI communications controller unit includes:
    a SCSI communications-channel state-sequencer for sequencing through predefined communication protocols of the SCSI communications channel;
    a SCSI FIFO for temporarily storing and transferring SCSI data; and
    a SCSI DMA-controller for controlling data block transfers between the SCSI FIFO and the local bus interface means.

12. An integrated circuit according to claim 1 wherein said second external communications channel is an analog-signal based channel.

13. An integrated circuit according to claim 12 wherein the first plurality of local bus interface terminals are positioned about a first portion of the periphery of the integrated circuit substrate and wherein the third plurality of interface terminals are positioned about an opposed second portion of the periphery of the integrated circuit substrate.

14. An integrated circuit according to claim 13 wherein the integrated circuit substrate is rectangular in shape, the first portion of the integrated circuit periphery bends about a first corner of the rectangular shape, and the second portion of the integrated circuit periphery bends about a diagonally-opposed second corner of the rectangular shape.

15. An integrated circuit according to claim 13 wherein the first and second portions of the integrated circuit periphery are spaced apart from one another.

16. An integrated circuit according to claim 1 wherein said external local bus operates at a peak data transfer rate at least as high as 132 megabytes per second.

17. An integrated circuit according to claim 16 wherein said external local bus operates at a clock rate of 33 MHz.

18. An integrated circuit according to claim 1 wherein said external local bus has an end-to-end data signal propagation time of less than 10 nanoseconds.

19. An integrated circuit according to claim 1 wherein said external local bus has a clock line and an end-to-end clock skew time of less than 2 nanoseconds.

20. An integrated circuit according to claim 1 wherein said interface ownership designating means includes:

(f.1) bus-master request/grant means for receiving chip-internal requests for ownership of the local bus interface means from a plurality of chip-internal transceiver units within said integrated circuit, for selectively forwarding such chip-internal requests as external bus request signals to an external bus-arbiter, for receiving corresponding bus ownership grants from the external bus-arbiter, and for selectively forming and forwarding corresponding chip-internal grants to the chip-internal transceiver units.

21. An integrated circuit according to claim 20 wherein said bus-master request/grant means can be programmed to operate in either of first and second arbitration modes, and wherein:

(f.1a) while in the first arbitration mode, the bus-master request/grant means selectively forwards chip-internal requests to a same external bus request line irrespective of which of the plurality of chip-internal transceiver units originated the corresponding chip-internal request;

(f.1b) while in the first arbitration mode, the bus-master request/grant means responds exclusively to a same one external bus grant line as said bus-master request/grant means selectively forms and forwards corresponding chip-internal grants to the chip-internal transceiver units irrespective of which of the plurality of chip-internal transceiver units originated the corresponding chip-internal request;

(f.1c) while in the second arbitration mode, the bus-master request/grant means selectively forwards chip-internal requests to different external bus request lines depending on which of the plurality of chip-internal transceiver units originated the corresponding chip-internal request; and (f.1d) while in the second arbitration mode, the bus-master request/grant means responds to different external bus grant lines as said bus-master request/grant means selectively forms and forwards corresponding chip-internal grants to the chip-internal transceiver units.

22. An integrated circuit according to claim 1 further comprising:

(g) first transceiving means, operatively interposed between said second plurality of interface terminals and the multiplexing means, for transferring address and data signals between said second plurality of interface terminals and the multiplexing means; and (h) second transceiving means, operatively interposed between said third plurality of interface terminals and the multiplexing means, for transferring address and data signals between said third plurality of interface terminals and the multiplexing means.

23. An integrated circuit according to claim 22 wherein the first transceiving means includes:

(g.1) a first FIFO for temporarily storing and transferring digital data of the first transceiving means, said first FIFO including Near-Full means for indicating when the first FIFO is about to overflow and Near-Empty means for indicating when the first FIFO is about to experience an underflow condition; and (g.2) a first multiplexer having first and second inputs respectively coupled to the Near-Full means and Near-Empty means of the first FIFO and an output coupled to the interface ownership designating means.

24. An integrated circuit according to claim 23 wherein the second transceiving means includes:

(g.3) a second FIFO for temporarily storing and transferring digital data of the second transceiving means, said second FIFO including Near-Full means for indicating when the second FIFO is about to overflow and Near-Empty means for indicating when the second FIFO is about to experience an underflow condition; and (g.4) a second multiplexer having first and second inputs respectively coupled to the Near-Full means and Near-Empty means of the second FIFO and an output coupled to the interface ownership designating means.

25. An integrated circuit according to claim 24 wherein the first transceiving means further includes:

(g. 3) data-flow direction indicating means for indicating whether data is flowing through the first transceiving means in a first or second direction, said data-flow direction indicating means having an output coupled to control an input selecting function of said first multiplexer.

26. An integrated circuit according to claim 1 wherein said first plurality of interface terminals includes:

(a.1) a first multiplicity of address/data terminals each for transferring address signals and bidirectionally transferring data signals in time multiplexed fashion;

wherein said local bus interface means includes:

(d.1) a second multiplicity of address/data output buffers corresponding to said first multiplicity, each address/data output buffer having a tri-state output coupled to a respective one of said first multiplicity of address/data terminals for outputting in respective time slots, respective parts of said address and data signals, each address/data output buffer further having an OEN input driven by the interface ownership designating means for selectively activating the corresponding output of that output buffer; and (d.2) a third multiplicity of input buffers corresponding to said first multiplicity, each input buffer having an input coupled to a respective one of said first multiplicity of address/data terminals for inputting in respective time slots, respective parts of said data signals; and wherein said multiplexing means includes:

(e.1) respective first and second AD busses for coupling respectively to the first and second communications channels, each of the first and second AD busses having a respective address portion and a respective data portion; and (e.2) phase selecting means driven by the interface ownership designating means for selectively coupling either the data or address portions of the selected one of the first and second communications channels to the address/data output buffers and the input buffers of the local bus interface means.

* * * * *

UNITED STATES PATENT AND TRADEMARK OFFICE
CERTIFICATE OF CORRECTION

PATENT NO. : 5,611,053
DATED : March 11, 1997
INVENTOR(S) : Chih-Siung Wu et al.

Page 1 of 7

It is certified that error appears in the above-indentified patent and that said Letters Patent is hereby corrected as shown below:

Column 10, line 45, "═══" should be --====--; line 46, "═" should be --==--.
Columns 10 - 18, the VerilogHDL™ listing should be as in the attached copy (correction pages 2-7) of the listing as originally filed.

Signed and Sealed this

Fourteenth Day of October, 1997

BRUCE LEHMAN

Attest:

Attesting Officer

Commissioner of Patents and Trademarks

```
module PCIMSTSTM(

// inputs
        RSTF_I,             // reset from system
        CLK_I,              // bus clock
        IRDYF_I,            // initiator ready
        TRDYF_I,            // target ready
        STOPF_I,            // stop
        DEVSELF_I,          // device select
        FRAMEF_I,           // cycle frame
        LOCKF_I,            // lock
        GNTAFQ,             // bus grant to master a
        GNTBFQ,             // bus grant to master b // state machine internal inputs
        DREQA,              // dma request from master a
        DREQB,              // dma request from master b
        READYA,             // ready to transfer data from master a
        READYB,             // ready to transfer data from master b
        DEV_TO,             // devsel time out
        CYCLEND,            // current access in last data phase
        MWR,                // master write
        MRD,                // master read
        LOCK_OP,            // locked operation // outputs
        MAD_OE,             // multiplexed address and data enable
        MPAR_OE,            // parity output enable
        MPERRF_OE,          // parity error output enable
        FRAMEF_O,           // cycle frame
        FRAMEF_OEN,         // cycle frame output enable
        CBEF_OEN,           // bus command and byte enable
        LOCKF_O,            // lock
        LOCKF_OEN,          // lock output enable
        IRDYF_O,            // initiator ready
        IRDYF_OEN,          // initiator ready output enable
        REQAF_OEN,          // bus request from master a
        REQBF_OEN,          // bus request from master b // state machine internal outputs
        OWNA,               // master a owns the bus
        OWNB,               // master b owns the bus
        MADDR_PHASE1,       // master address phase, original 1 clk width
        MADDR_PHASE,        // master address phase, earlier, 2 clk width
        SMADDR_PHASE1,      // scsi master address phase, 1 clk width
        SMADDR_PHASE,       // scsi master address phase, 2 clk width
        HMADDR_PHASE,       // hilance master address phase, 2 clk width
        MDATA_PHASE,        // master data phase
        SMDATA_PHASE,       // scsi master data phase
        HMDATA_PHASE,       // hilance master data phase
        SMABORT,            // scsi master abort
        STABORT,            // scsi target abort
        HMABORT,            // hilance master abort
        HTABORT             // hilance target abort
```

```verilog
);

input RSTF_I,CLK_I,IRDYF_I,TRDYF_I,STOPF_I,DEVSELF_I,FRAMEF_I,LOCKF_I;
input DEV_TO,CYCLEND,MWR,MRD,LOCK_OP;
input GNTAFQ,DREQA,READYA;
input GNTBFQ,DREQB,READYB;
output REQAF_OEN,REQBF_OEN;
output MAD_OE,MPAR_OE,MPERRF_OE,FRAMEF_O,FRAMEF_OEN,CBEF_OEN,LOCKF_O,LOCKF_OEN;
output IRDYF_O,IRDYF_OEN,OWNA,OWNB;
output MADDR_PHASE1,MADDR_PHASE,SMADDR_PHASE1,SMADDR_PHASE,HMADDR_PHASE;
output MDATA_PHASE,SMDATA_PHASE,HMDATA_PHASE,SMABORT,STABORT,HMABORT,HTABORT;
reg STEP,MPAR_OE,MPERRF_OEPRE1,MPERRF_OE,L_STOPF,LOCK_XFD;
reg OWNA,OWNB,OWN_LOCK,LOCKF_OE,LS_TAR,FRAMEFIX;
reg MST_TO,TABORT,OWNA1Q,OWNB1Q,SMDATA_PHASE1,HMDATA_PHASE1;
wire MPAR_OEPRE,MPERRF_OEPRE2;
wire FRAMEF_OE,CBEF_OE,IRDYF_OE;
wire MABORT;
wire OWNA0,OWNA1D,OWNB0,OWNB1D,OWN_LOCK0,OWN_LOCK1,LOCKF_OE0,LOCKF_OE1;
wire FRAMEFI,IRDYFI,TRDYFI,DEVSELFI,STOPFI,LOCKFI;
wire BUS_PARK,MST_TOS,SMDATA_PHASE0,HMDATA_PHASE0;

parameter dly = 2;

assign FRAMEFI = ~(FRAMEF_I === 0);
assign IRDYFI = ~(IRDYF_I === 0);
assign TRDYFI = ~(TRDYF_I === 0);
assign DEVSELFI = ~(DEVSELF_I === 0);
assign STOPFI = ~(STOPF_I === 0);
assign LOCKFI = ~(LOCKF_I === 0);

parameter [2:0]  // synopsys enum mst_bus_state
            IDLE    =3'b000,     // idle condition
            DR_BUS  =3'b001,     // bus parked at this agent
            ADDRS   =3'b011,     // master start as access
            M_DATA  =3'b010,     // master transfer data
            TURN_AR =3'b110,     // completed transaction
            S_TAR   =3'b111;     // stop asserted, do turn around cycle parameter [0:0]
            FREE    =1'b0,       // lock# is not owned by others
            BUSY    =1'b1;       // lock# is currently owned by others reg [2:0]   // synopsys enum mst_bus_state
            mb_state,nmb_state;  // master bus state, next reg
            ml_state,nml_state;  // master lock state, next // synopsys state_vector mb_state always @(posedge CLK_I or negedge RSTF_I)
        if (!RSTF_I) begin
                    mb_state <= #dly IDLE;
                    ml_state <= #dly FREE;
                end
        else      begin
                    mb_state <= #dly nmb_state;
                    ml_state <= #dly nml_state;
                end always @(mb_state or REQAF_OEN or REQBF_OEN or GNTAFQ or GNTBFQ or FRAMEFI or FRAME
        or IRDYFI or TRDYFI or STOPFI or DEV_TO)
 begin
```

```verilog
                                STEP = 'b0;
                                nmb_state = IDLE;
        case(mb_state)   // synopsys full_case parallel_case
          IDLE: begin
                                STEP = 'b1;
                if (((!REQAF_OEN && !GNTAFQ || !REQBF_OEN && !GNTBFQ) &&
                    FRAMEFI && IRDYFI && !STEP)
                                nmb_state = ADDRS;
                  else
                    if ((REQAF_OEN && !GNTAFQ || REQBF_OEN && !GNTBFQ ||
                        (!REQAF_OEN && !GNTAFQ || !REQBF_OEN && !GNTBFQ) && STEP)
                        && FRAMEFI && IRDYFI)
                                nmb_state = DR_BUS;
                    else
                                nmb_state = IDLE;
                end ADDRS: begin
                                nmb_state = M_DATA;
                end M_DATA:begin
                  if (!FRAMEF_O || FRAMEF_O && TRDYFI && STOPFI && !DEV_TO)
                                nmb_state = M_DATA;
                  else
                    if (FRAMEF_O && !TRDYFI && STOPFI)
                                nmb_state = TURN_AR;
                      else
                        if (FRAMEF_O && !STOPFI || FRAMEF_O && DEV_TO)
                                nmb_state = S_TAR;
                end TURN_AR:begin
                  if ((!REQAF_OEN && !GNTAFQ || !REQBF_OEN && !GNTBFQ) && !STEP)
                                nmb_state = ADDRS;
                    else
                      if (REQAF_OEN && !GNTAFQ || REQBF_OEN && !GNTBFQ ||
                          (!REQAF_OEN && !GNTAFQ || !REQBF_OEN && !GNTBFQ) && STEP)
                                nmb_state = DR_BUS;
                        else
                                nmb_state = IDLE;
                end S_TAR: begin
                  if (!GNTAFQ || !GNTBFQ)
                                nmb_state = DR_BUS;
                    else
                                nmb_state = IDLE;
                end DR_BUS:begin
                  if (((!REQAF_OEN && !GNTAFQ || !REQBF_OEN && !GNTBFQ) && !STEP)
                                nmb_state = ADDRS;
                    else
                      if (((!REQAF_OEN && !GNTAFQ || !REQBF_OEN && !GNTBFQ) && STEP ||
                          REQAF_OEN && !GNTAFQ || REQBF_OEN && !GNTBFQ)
                                nmb_state = DR_BUS;
                        else
                                nmb_state = IDLE;
                end
          endcase
     end always @(ml_state or LOCKFI or FRAMEFI or OWN_LOCK)
 begin
```

```verilog
                                nml_state = FREE;
            case(ml_state) // synopsys full_case parallel_case
                FREE:  begin
                            if (!LOCKFI && !OWN_LOCK)
                                        nml_state = BUSY;
                            else
                                        nml_state = FREE;
                        end
                BUSY:  begin
                            if (LOCKFI && FRAMEFI)
                                        nml_state = FREE;
                            else
                                        nml_state = BUSY;
                        end
            endcase
    end // LOCK_XFD: Data was transfered during a lock operation
always @(LOCKF_O or IRDYF_O or TRDYFI)
  if (!IRDYF_O && !TRDYFI)
        LOCK_XFD = -LOCKF_O;

assign MADDR_PHASE1 = (mb_state == ADDRS);
assign MADDR_PHASE = (mb_state == DR_BUS) | (mb_state == ADDRS);
assign SMADDR_PHASE1 = MADDR_PHASE1 & OWNA;
assign SMADDR_PHASE = MADDR_PHASE & OWNA;
assign HMADDR_PHASE = MADDR_PHASE & OWNB;

assign MDATA_PHASE = (mb_state == M_DATA);
assign SMDATA_PHASE0 = MDATA_PHASE & OWNA;
assign HMDATA_PHASE0 = MDATA_PHASE & OWNB;

always @(negedge RSTF_I or posedge CLK_I)
  if (!RSTF_I)
     begin
         SMDATA_PHASE1 <= #dly 'b0;
         HMDATA_PHASE1 <= #dly 'b0;
     end
  else
     begin
         SMDATA_PHASE1 <= #dly MADDR_PHASE1 & OWNA;
         HMDATA_PHASE1 <= #dly MADDR_PHASE1 & OWNB;
     end assign SMDATA_PHASE = SMDATA_PHASE0 | SMDATA_PHASE1;
assign HMDATA_PHASE = HMDATA_PHASE0 | HMDATA_PHASE1;

assign MABORT = (mb_state == M_DATA) & DEV_TO;

always @(posedge CLK_I)
        TABORT <= #dly (mb_state == M_DATA) & -STOPFI & DEVSELFI & FRAMEF_O &
                        -IRDYF_O;

assign SMABORT = MABORT & OWNA;
assign STABORT = TABORT & OWNA;
assign HMABORT = MABORT & OWNB;
assign HTABORT = TABORT & OWNB;

assign BUS_PARK = (mb_state == DR_BUS);

assign OWNA0 = FRAMEF_OEN & IRDYF_O & TRDYFI & (REQAF_OEN | GNTAFQ) & -BUS_PA
                & -CLK_I | -RSTF_I;
assign OWNA1D = FRAMEFI & IRDYFI & -REQAF_OEN & -GNTAFQ;
```

```
always @(posedge MADDR_PHASE1 or posedge CLK_I)
 if (MADDR_PHASE1)
         OWNA1Q <= #dly 'b0;
 else
         OWNA1Q <= #dly OWNA1D;

always @(OWNA0 or OWNA1Q or REQAF_OEN or GNTAFQ)
 if (OWNA0)
         OWNA <= #dly 'b0;
 else
  if (OWNA1Q)
         OWNA <= #dly  (-REQAF_OEN | -GNTAFQ);

assign OWNB0 = FRAMEF_OEN & IRDYF_O & TRDYFI & (REQBF_OEN | GNTBFQ) & -BUS_PARK
                 & -CLK_I | -RSTF_I;
assign OWNB1D = FRAMEFI & IRDYFI & -REQBF_OEN & -GNTBFQ;

always @(posedge MADDR_PHASE1 or posedge CLK_I)
 if (MADDR_PHASE1)
         OWNB1Q <= #dly 'b0;
 else
         OWNB1Q <= #dly OWNB1D;

always @(OWNB0 or OWNB1Q or REQBF_OEN or GNTBFQ)
 if (OWNB0)
         OWNB <= #dly 'b0;
 else
  if (OWNB1Q)
         OWNB <= #dly (-REQBF_OEN | -GNTBFQ);

assign OWN_LOCK0 = FRAMEF_OEN & LOCKF_O | -RSTF_I;
assign OWN_LOCK1 = LOCKFI & FRAMEFI & IRDYFI &
                    (-REQAF_OEN & -GNTAFQ | -REQBF_OEN & -GNTBFQ) & LOCK_OP;

always @(OWN_LOCK0 or OWN_LOCK1 or LOCK_OP)
 if (OWN_LOCK0)
         OWN_LOCK <= #dly 'b0;
 else
  if (OWN_LOCK1)
         OWN_LOCK <= #dly LOCK_OP;

assign LOCKF_OE0 = FRAMEF_OEN & IRDYF_O & LOCKF_O | -RSTF_I;
assign LOCKF_OE1 = OWN_LOCK & (mb_state == M_DATA);

always @(LOCKF_OE0 or LOCKF_OE1 or OWN_LOCK)
 if (LOCKF_OE0)
         LOCKF_OE <= #dly 'b0;
 else
  if (LOCKF_OE1)
         LOCKF_OE <= #dly OWN_LOCK;

assign FRAMEF_OE = (mb_state == ADDRS) | (mb_state == M_DATA);

assign CBEF_OE = (mb_state == ADDRS) | (mb_state == M_DATA) |
                    (mb_state == DR_BUS);

assign MAD_OE = (mb_state == ADDRS) | (mb_state == M_DATA) & MWR |
                    (mb_state == DR_BUS);

assign IRDYF_OE = (mb_state == ADDRS) | (mb_state == M_DATA) |
                    (mb_state == TURN_AR) | (mb_state == S_TAR);

assign REQAF_OEN = -((DREQA & -LOCK_OP | DREQA & LOCK_OP & (ml_state == FREE)) &
                    (-((mb_state == S_TAR) | LS_TAR)));

assign REQBF_OEN = -((DREQB & -LOCK_OP | DREQB & LOCK_OP & (ml_state == FREE)) &
```

```
                         (~((mb_state == S_TAR) | LS_TAR)));
assign MPAR_OEPRE = (mb_state == DR_BUS) | (mb_state == ADDRS) |
                    (mb_state == M_DATA) & !IRDYF_O & MWR;

assign MPERRF_OEPRE2 = (mb_state == M_DATA) & !TRDYFI & MRD |
                       (mb_state == TURN_AR) | (mb_state == S_TAR);

assign FRAMEF_O = ~((mb_state == DR_BUS) | (mb_state == ADDRS) |
                    (mb_state == M_DATA) & ~DEV_TO & ~FRAMEFIX &
                    (~CYCLEND & (~MST_TO | ~GNTAFQ & OWNA | ~GNTBFQ & OWNB) .
                    L_STOPF | ~READYA & OWNA | ~READYB & OWNB));

assign IRDYF_O = ~((mb_state == M_DATA) &
                   (READYA & OWNA | READYB & OWNB | DEV_TO));

assign LOCKF_O = OWN_LOCK & (mb_state == ADDRS) | TABORT | MABORT |
                 (mb_state == M_DATA) & ~L_STOPF & TRDYFI & ~LOCK_XFD |
                 OWN_LOCK & ~LOCK_OP & CYCLEND & (mb_state == M_DATA) &
                 FRAMEF_O & ~TRDYFI;

always @(posedge CLK_I)
          LS_TAR <= #dly (mb_state == S_TAR);

always @(posedge CLK_I)
          MPAR_OE <= #dly MPAR_OEPRE;

always @(posedge CLK_I)
 begin
          MPERRF_OEPRE1 <= #dly MPERRF_OEPRE2;
          MPERRF_OE <= #dly MPERRF_OEPRE1;
 end always @(posedge CLK_I)
          L_STOPF <= #dly STOPFI;

assign MST_TOS = ~(MDATA_PHASE & MST_TO);
always @(negedge MST_TOS or posedge CLK_I)
 if (!MST_TOS)
        MST_TO <= #dly 1'b1;
 else
        MST_TO <= #dly (OWNA & GNTAFQ | OWNB & GNTBFQ) & ~TRDYFI;

always @(FRAMEF_OEN or MST_TO)
 if (FRAMEF_OEN)
          FRAMEFIX <= #dly 'b0;
 else
  if (MST_TO)
          FRAMEFIX <= #dly 'b1;

assign FRAMEF_OEN = ~FRAMEF_OE;
assign CBEF_OEN = ~CBEF_OE;
assign LOCKF_OEN = ~LOCKF_OE;
assign IRDYF_OEN = ~IRDYF_OE;

endmodule // PCIMSTSTM
```